United States Patent
Friedmann

(10) Patent No.: US 7,341,524 B2
(45) Date of Patent: Mar. 11, 2008

(54) TORSIONAL VIBRATION DAMPER

(75) Inventor: Oswald Friedmann, Lichtenau (DE)

(73) Assignee: Luk Lamellen und Kupplungsbau Beteiligungs KG, Buehl (DE)

(*) Notice: Subject to any disclaimer, the term of this patent is extended or adjusted under 35 U.S.C. 154(b) by 237 days.

(21) Appl. No.: 11/058,983

(22) Filed: Feb. 16, 2005

(65) Prior Publication Data

US 2005/0181880 A1  Aug. 18, 2005

(30) Foreign Application Priority Data

Feb. 18, 2004  (DE) ...................... 10 2004 008 121

(51) Int. Cl.
*F16F 15/121* (2006.01)

(52) U.S. Cl. ................................... 464/68.1

(58) Field of Classification Search ..... 464/67.1–68.92
See application file for complete search history.

(56) References Cited

U.S. PATENT DOCUMENTS

| | | | |
|---|---|---|---|
| 4,729,465 A | 3/1988 | Reik | |
| 4,751,992 A | 6/1988 | Maucher et al. | |
| 4,889,009 A | 12/1989 | Friedmann et al. | |
| 5,194,046 A | 3/1993 | Jäckel | |
| 5,349,883 A | 9/1994 | Reik | |
| 5,687,618 A | 11/1997 | Kajitani et al. | |
| 5,848,938 A | 12/1998 | Curtis et al. | |
| 7,192,354 B2 * | 3/2007 | Uehara | 464/68.4 |
| 2003/0205857 A1 | 11/2003 | Fujita et al. | |

FOREIGN PATENT DOCUMENTS

EP          0 984 195          3/2000

* cited by examiner

*Primary Examiner*—Greg Binda
(74) *Attorney, Agent, or Firm*—Davidson, Davidson & Kappel

(57) ABSTRACT

A torsional vibration damper, particularly for use between the engine and the transmission of the power train in a motor vehicle, including two flywheels rotatable relative to each other against the opposition of a first energy storing device employing, for example, one or more coil springs and a second energy storing device, which is carried by one of the flywheels, which operates in parallel with the first energy storing device and which opposes rotation of the two flywheels relative to each other. In order to isolate the irregularities of movement of the first flywheel (such as vibrations which develop while the engine is in operation) from the second flywheel, the second energy storing device (such as a snap spring or a set of diaphragm springs) is coupled to the flywheels in such a way that the second flywheel develops a degressive action only when the first flywheel is caused to move through relatively small angles (especially between 1° and 10°) but not when the angles are larger (especially larger than 10°).

15 Claims, 6 Drawing Sheets

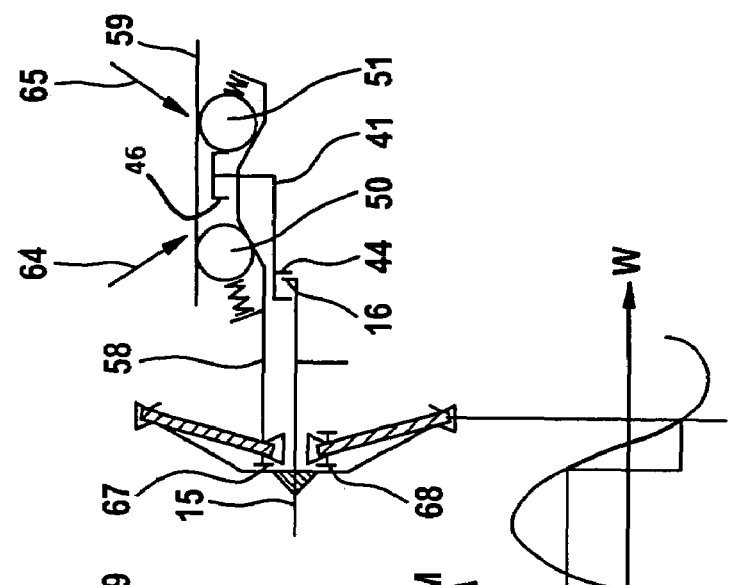
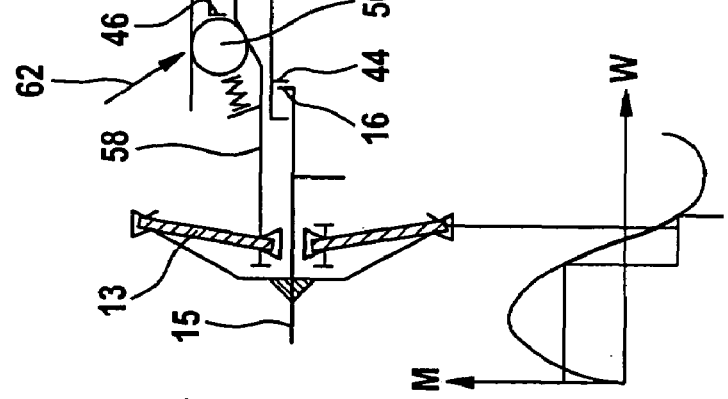
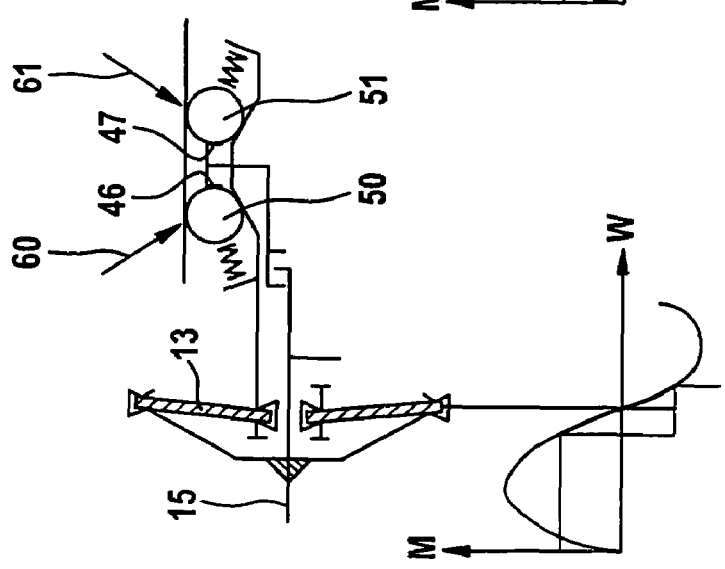

TORSIONAL VIBRATION DAMPER

CROSS-REFERENCE TO RELATED CASES

This-application claims the priority of the commonly-owned copending German patent application Serial No. 10 2004 008 121.2-11 filed Feb. 18, 2004. The disclosure of this German patent application, as well as those of each US and/or foreign patent and/or patent application identified in the specification of the present application, are incorporated herein by reference.

BACKGROUND OF THE INVENTION

This invention relates to improvements in torsional vibration dampers, especially to those employing so-called split flywheels, wherein a first or primary rotary flywheel or mass is connectable to the output shaft of a prime mover (for example, the rotary output shaft of an internal combustion engine in the power train of a motor vehicle), a second or secondary rotary flywheel or mass which can be connected to at least one rotary input element of a change-speed transmission in the power train of the vehicle, first energy storing means which serves to yieldably oppose rotation of the flywheels relative to each other, and second energy storing means operating in parallel with the first energy storing means and also serving to oppose rotation of one flywheel relative to the other flywheel.

Numerous torsional vibration dampers of the above outlined character are utilized in the power trains of motor vehicles to reduce the likelihood of transmission of undesirable forces and/or movements between the flywheel which receives torque from the prime mover and the flywheel which is connected to one or more rotary elements of a second rotary component (e.g., one or more rotary input shafts in the transmission) of the power train. Depending upon the nature of operation of the motor vehicle, the angular displacement of one flywheel relative to the other flywheel can vary within a rather wide range. Furthermore, the nature of operation of the prime mover can be such that, under certain normally undesirable circumstances, the prime mover causes the primary flywheel to oscillate. Such oscillatory movements of the primary flywheel should not be transmitted to the secondary flywheel because they would be likely to entail damage to the transmission of the power train and/or to generate undesirable noise.

Examples of presently known power trains which employ torsional vibration dampers with primary and secondary flywheels and several energy storing members which oppose rotation-of the flywheels relative to each-other are-those disclosed in commonly owned U.S. Pat. No. 4,729,465 (granted Mar. 8, 1988 to Reik for "ASSEMBLY FOR COMPENSATING FOR FLUCTUATIONS OF TORQUE WHICH IS TRANSMITTED BY AN INTERNAL COMBUSTION ENGINE"), U.S. Pat. No. 4,751,992 (granted Jun. 21, 1988 to Maucher et al. for "COMPOSITE FLYWHEEL WITH SLIP CLUTCH"), U.S. Pat. No. 4,889,009 (granted Dec. 26, 1989 to Oswald Friedmann et al. for "TORQUE TRANSMITTING MECHANISM") as well as in numerous additional U.S. patents granted to the assignee of the present application.

SUMMARY OF THE INVENTION

An object of the present invention is to provide a torsional vibration damper which can be installed in the power train of a motor vehicle between the prime mover and the transmission and is constructed and assembled in such a way that any irregularities which develop during operation of the prime mover are isolated (as far as vibratory movements of the output element of the prime mover are concerned) so that they cannot be transmitted to and cannot affect the movements of the secondary flywheel and/or of the part or parts receiving motion from the secondary flywheel.

An alternate or additional object of the present invention is to provide a torsional vibration damper wherein one of the energy storing means between the first and second flywheels is arranged to function in a novel manner to reduce the likelihood of transmission of undesirable movements to the second flywheel and/or to prevent the generation of noise in and/or by the component parts which receive torque form the second flywheel.

A further alternate or additional object of the instant invention is to provide a torsional vibration damper wherein the primary flywheel or mass is prevented from transmitting undesirable vibrations to the secondary flywheel or mass.

Another alternate or additional object of this invention is to provide a torsional vibration damper which can be utilized with advantage in presently known motor vehicles as a superior substitute for presently known torsional vibration dampers.

Yet a further alternate or additional object of this invention is to provide a novel combination of plural energy storing means between the primary and secondary flywheels or masses in a torsional vibration damper for use in the power train of a motor vehicle between the rotary output element of a prime mover and the rotary input element(s) of a change-speed transmission.

Another alternate or additional object of the invention is to provide a novel and improved method of transmitting only certain torque between the primary and secondary flywheels of a torsional vibration damper.

A further alternate or additional object of this invention is to provide a novel method of preventing the transmission of undesirable movements (such as oscillations) between the primary and secondary flywheels of a torsional vibration damper.

The invention provides a torsional vibration damper which comprises a first mass non-rotatably connectable with the rotary output element of a prime mover (such as the crankshaft of an internal combustion engine in a power train of a motor vehicle) and a second mass which can be connected to the input shaft(s) of a change speed transmission in the power train. The second mass is rotatable with and relative to the first mass, and the damper further comprises a first energy storing device which operates between the two masses and a second energy storing device which operates between the masses in parallel with and with freedom of rotation relative to the first device. A connection is provided which is established between the secondary energy storing device and the masses and is arranged to develop a degressive effect only in response to small or relatively small angular displacements of the masses relative to each other. Such angular displacements can be in the range of between about 1° and about 10°; they at most equal or approximate 10°.

The first and second masses can respectively constitute the primary and secondary flywheels of a split flywheel, and the second energy storing means can comprise resilient means having a degressive characteristic curve; such resilient means can comprise a snap spring.

The aforementioned connection can comprise means for fixedly connecting the second energy storing device to one of the masses, and such connection can further comprise means for securing the second energy storing device to the other of the masses for angular movements through small angles in response to the application of relatively small forces. For example, the securing means can comprise a freewheel arrangement and such arrangement can comprise two freewheels acting in opposite directions. It is also possible to employ a freewheel arrangement which includes a double-acting freewheel.

In accordance with a presently preferred feature of the invention, the freewheel arrangement comprises at least one rolling element (such as one or more rollers or spheres) which is turnable relative to a radially outer portion of the second energy storing device. Such arrangement can further comprise a guide channel which is provided on the aforementioned radially outer portion of the second energy storing device and receives the at least one rolling element. The channel is preferably inclined relative to a circle having a center on the common axis of the two masses. This arrangement can further comprise a guide having a pair of sidewalls which flank the channel, and such sidewalls are or can be at least substantially parallel to each other. The channel has a predetermined width, and the end portions of the sidewalls can be spaced apart from each other less than the predetermined width of the channel. An annular roof-shaped connector can be provided to overlie a radially outermost portion of the channel between the two sidewalls. It is also possible to provide in the channel friction linings which can be clamped between the guide arrangement and one of the flywheels as a function of the condition of the second energy storing device. The just mentioned one flywheel is or can constitute the first flywheel.

BRIEF DESCRIPTION OF THE DRAWINGS

The novel features which are considered as characteristic of the invention are set forth in particular in the appended claims. The improved torsional vibration damper itself, however, both as to its construction and the modes of assembling, installing and utilizing the same, together with numerous additional important and advantageous attributes thereof, will be best understood upon perusal of the following detailed description of certain presently preferred specific embodiments with reference to the accompanying drawings, in which:

FIG. 5 illustrates a detail in the damper of FIG. 4 when the magnitude of torque being transmitted between the flywheels equals or approximates zero;

FIG. 6 shows the structure of FIG. 5 but with one of two spherical freewheel elements in clamped condition;

FIG. 7 illustrates the structure of FIGS. 5 and 6 but with one of the spherical freewheel elements in unclamped condition;

DETAILED DESCRIPTION

Figure 1:
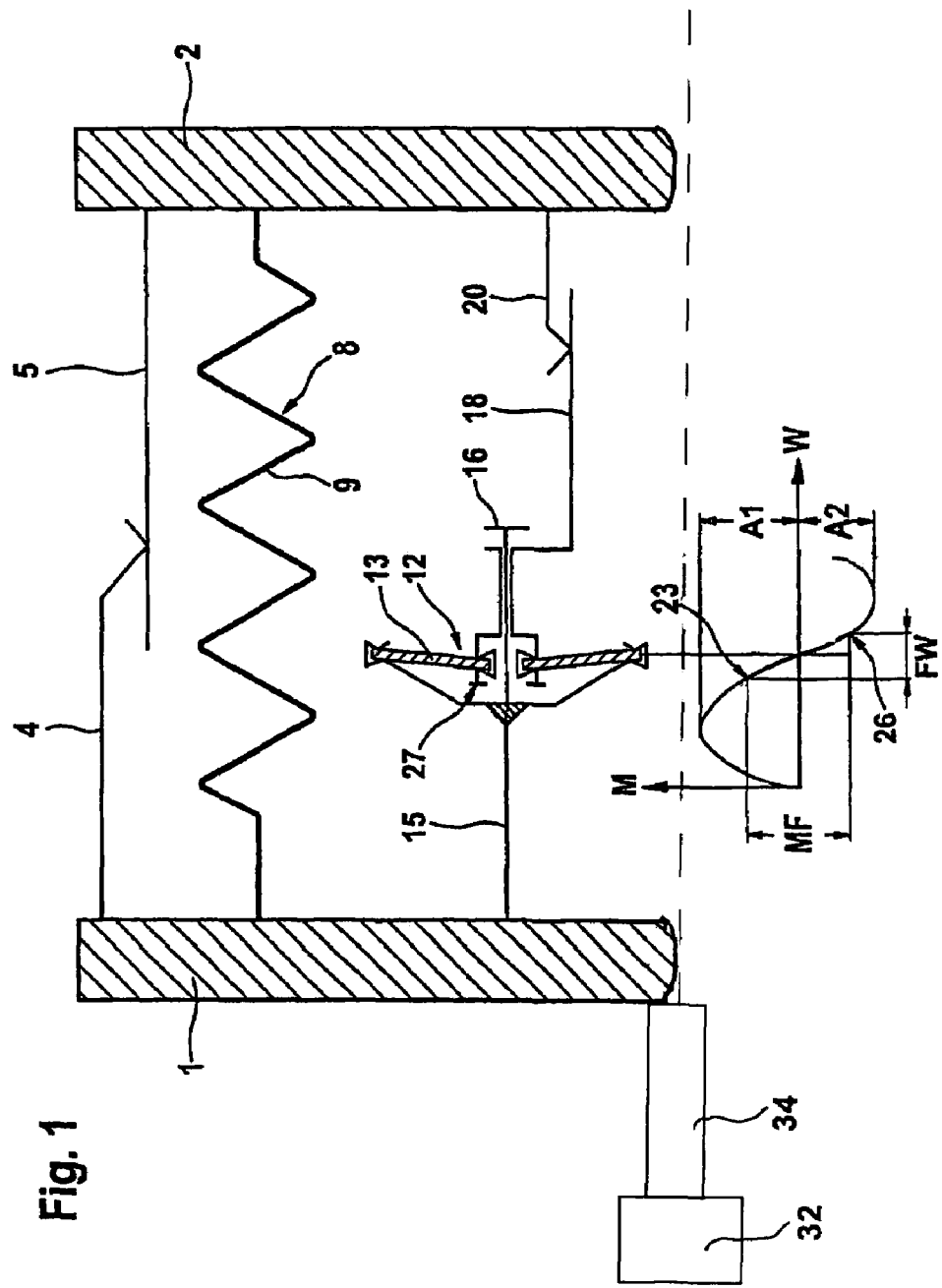
FIG. 1 is a fragmentary schematic partly sectional view of a torsional vibration damper wherein the energy storing devices between the primary and secondary flywheels are constructed and installed in accordance with a first embodiment of the present invention.

FIG. 1 illustrates certain relevant component parts of a torsional vibration damper which embodies a first form of the present invention and constitutes a twin-mass flywheel. The latter comprises a first or primary rotary mass or flywheel 1 which is assumed to be affixed to the rotary output shaft 34 (e.g., a crankshaft) of a prime mover 32, such as an internal combustion engine, in the power train of a motor vehicle, and a second or secondary rotary mass or flywheel 2. The latter is coaxial with and can rotate relative to the first flywheel 1 and is assumed to be affixed to a rotary input component (e.g., a shaft) of the transmission in the aforementioned power train. A bearing is interposed between the flywheels 1 and 2. The basic friction which develops in response to rotation of one of the flywheels 1, 2 relative to the other flywheel is indicated by a first line 4 extending from the first flywheel 1 and having a toothed end portion, and a straight second line 5 contacting the toothed portion of the first line 4 and extending from the second flywheel 2.

The first flywheel 1 can transmit torque to the second flywheel 2 by way of a composite first energy storing device 8 having discrete energy storing elements. These elongated energy storing elements can constitute elongated coil springs which extend circumferentially of the flywheel 1, which can undergo pronounced compression through large angles and which are received in a chamber (not shown) preferably containing a supply of a viscous medium; such medium can fill at least a portion of the just mentioned chamber for the coil springs 9. Reference may be had, for example, to commonly owned U.S. Pat. No. 5,349,883 granted Sep. 27, 1994 to Reik et al. for "APPARATUS FOR COUNTER-ACTING TORSIONAL STRESSES."

The improved torque transmitting means further comprises a degressive second energy storing device 12 which is arranged to operate in parallel with the first energy storing device 8 and comprises a so-called snap spring or kickover spring 13. The progress of torque M being transmitted by the snap spring 13 is shown in the coordinate system beneath this spring. The character W denotes the extent of angular displacement of the flywheels 1, 2 relative to each other. The progress of torque M resembles a sine curve having a positive amplitude A1 somewhat exceeding its negative amplitude A2.

The radially outer portion of the snap spring 13 is engaged by a connecting member 15 which is fixedly secured to the primary flywheel 1 and has a free end provided with an abutment or stop 16 engageable by an intermediate part 18 connected to the radially inner portion of the snap spring 13. The part 18 is movable relative to the second flywheel 2 when the friction torque reaches a value of between 4 and 8 Nm; this is indicated by the line 20 extending from the flywheel 2 and having a toothed end portion contacting the intermediate part 18.

When the primary flywheel 1 is caused to turn relative to the secondary flywheel 2 (referring to FIG. 1, such turning of the flywheel 1 involves a movement toward the secondary flywheel 2), the torque being generated by the snap spring 13 of the energy storing device 12 increases during the first or initial stage of such movement of the flywheel 1 until the magnitude of torque reaches the value A1. The torque being generated by the snap spring 13 thereupon decreases; the point 23 of the torque curve shown in the lower part of FIG. 1 is reached when the intermediate part 18 abuts the stop 16 on the connecting member 15. This corresponds to the situation when the part 18 reaches the stop 16. The torque decrease to zero value and thereupon changes to a negative value between the points 23 and 26 of the sinusoidal curve. The central portion of the spring 13 reaches an abutment 27 of the intermediate part 18 at the point 23. The range of angular movements of the primary flywheel 1 while the magnitude of the torque being generated by the spring 13 decreases from the positive value denoted by the point 23, through the zero value (when the sinusoidal curve intersects the abscissa of the coordinate system shown in the lower part of FIG. 1) and thereupon to the negative value 26 can be said to constitute a free angle FW which, in the embodiment of FIG. 1, is assumed to amount to 1.5(-). The torque MF between the points 23 and 26 is assumed to amount to 3.75 Nm.

Figure 2:
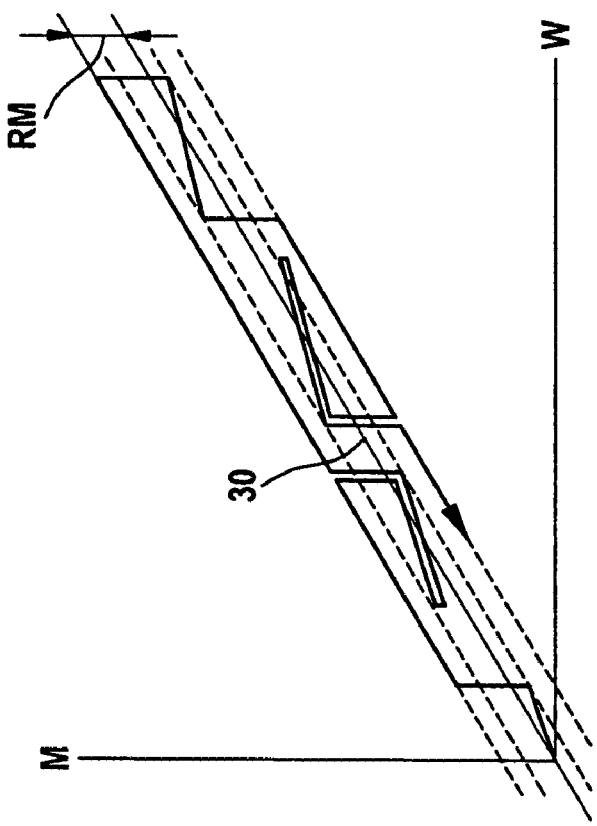
FIG. 2 shows a coordinate system wherein the magnitude of torque being transmitted by one of the flywheels shown in FIG. 1 is measured along the ordinate and the extent of angular displacement of one flywheel is measured along the abscissa, the curve representing the transmission of torque when the moment of friction equals or approximates 4 Nm.

FIG. 2 illustrates the progress of torque M of the torsional vibration damper FIG. 1. The angular displacement W is measured along the abscissa of the coordinate system of FIG. 2, and the character RM denotes the friction torque which is assumed to be in the range of 4 Nm. The slope of the arcuate springs 9 in the damper of FIG. 1 is denoted by the straight line 30. Since the torque of the snap spring 13 at first increases and opposes the torque of the arcuate energy storing device 8, the torque M of FIG. 2 initially increases at a rate less than that of the coil springs 9. After reaching the point 23 shown in FIG. 1 but prior to reaching the point 26, the spring 13 of the energy storing device 12 snaps over so that, from then on, only the energy storing device 8 continues to remain-effective. When the angular movement of the primary flywheel 1 relative to the secondary flywheel 2 is reversed, the spring 13 snaps back to the position of FIG. 1.

Figure 3:
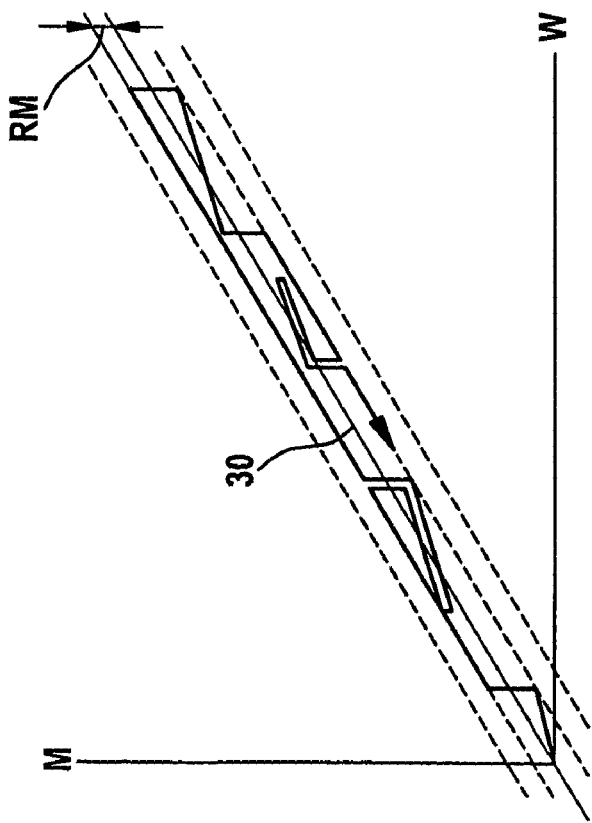
FIG. 3 illustrates the coordinate system of FIG. 2 but with the curve denoting the moment of friction at a friction torque of or close to 8 Nm.

FIG. 3 illustrates the progress of torque in the torsional vibration damper of FIG. 1 when the friction torque RM is or approximates 8 Nm. An advantage of the novel second energy storing device 12 is that it shares the angular displacements of the discrete energy storing elements 9 of the energy storing device 8. This ensures that the degressive snap spring 13 is required to store only the energy for the required partial loops for the insulation of irregularities attributable to the prime mover which drives the primary flywheel 1. Such mode of operation renders it possible to reduce the effective rise of torque to any desired extent.

A feature of the invention which is embodied in the torsional vibration damper of FIGS. 1 to 3 is that the second energy storing device 12 is coupled with the flywheels 1 and 2 in such a way that it develops a degressive effect only at relatively small angular displacements of the flywheels 1 and 2 relative to each other, especially at angular displacements within the range of between about 1° and 10° but not at relatively large angular displacements, especially at angular displacements exceeding 10°.

The damper of FIG. 1 further comprises customary bearings (not shown in FIGS. 1 to 3) which permit the flywheels 1, 2 to turn relative to each other. The purpose of the energy storing devices 8 and 12 is that they prevent the transmission (to the flywheel 2 and to the shaft(s) or other rotary part or parts receiving torque from the flywheel 2) of oscillatory movements which develop or can develop when the prime mover drives the primary flywheel 1.

The so-called free angle FW (see FIG. 1) within which the second energy storing device 12 performs its degressive effect preferably amounts to between 1° and 10°, especially 6°. Furthermore, the degressive effect of the second energy storing device 12 is attuned to the effect of the first energy storing device 8 in such a way that the action of device 8 is at least substantially compensated for within the aforementioned free angle FW.

The embodiment which is shown in FIGS. 1 to 3 and wherein the spring 13 of the second energy storing device 12 exhibits a degressive characteristic curve constitutes one presently preferred feature of the present invention. The degressive snap spring 13 can be of one piece or can constitute a composite spring having two diaphragm springs which operate counter to each other (this will be described with reference to FIGS. 8 and 9). Alternatively, the improved torsional vibration damper can be assembled in such a way that it does not employ any springs having degressive characteristics; such characteristics can be developed by employing an energy storing device which exhibits desirable degressive characteristics by utilizing suitable ramps.

FIG. 1 shows that the resilient element 13 of the second energy storing device 12 is a one-piece snap spring or kickover spring. As already mentioned hereinbefore, and as will be described with reference to FIGS. 8 and 9, such one-piece snap spring can be replaced by a composite resilient element which, in the embodiment of FIGS. 8 and 9, employs two diaphragm springs (77, 78) which are constructed and installed to act in opposite directions. The purpose of the single snap spring 13 (or of its equivalents or substitutes 77, 78) is to compensate for the effect of the first energy storing device 8 when the extent (W) of angular displacement of flywheels 1, 2 relative to each other is rather small. The abutments or stops (such as 16, 27 or their equivalents) for the snap spring 13 can be resilient or can perform a damping action.

In accordance with a first modification of the torsional vibration damper which is shown in FIGS. 1 to 3, the second energy storing device 12 or an equivalent thereof is fixedly secured to one of the flywheels or masses 1, 2. It is often preferred to fixedly secure the second energy storing device to the second flywheel; this ensures that an impulse which develops when the torsional vibration damper is in use cannot be transmitted to the part or parts (such as a change-speed transmission) which is or are connected with the second flywheel.

Figure 4:
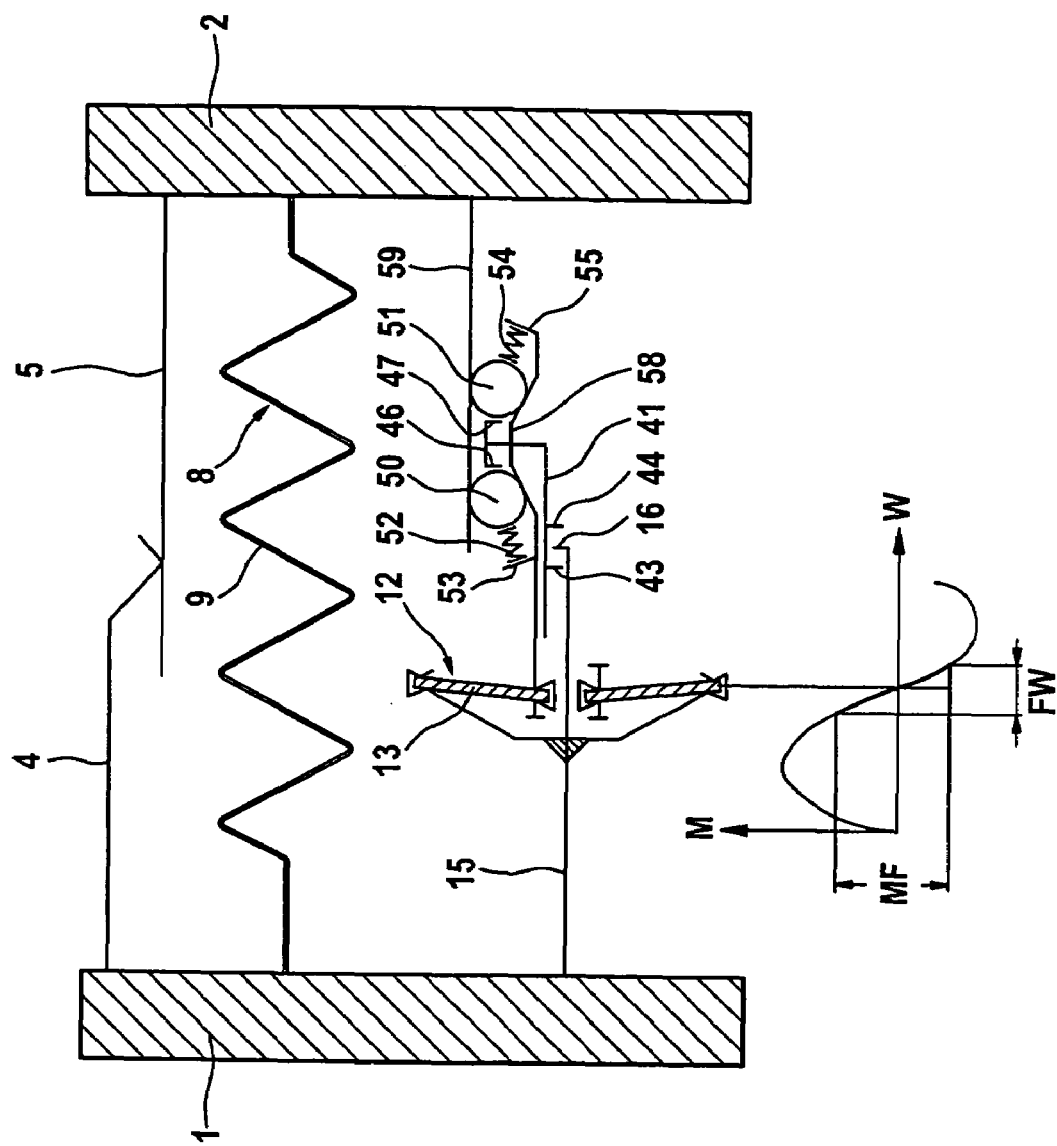
FIG. 4 illustrates a torsional vibration damper which constitutes a first modification of the damper shown in FIG. 1.

It is also within the purview of the present invention to couple the second energy storing device (such as the device 12 or an equivalent thereof) with one (e.g., 2) of the flywheels 1, 2 in such a way that the other flywheel (1) can turn relative to the one flywheel through small angles without encountering a pronounced resistance to such angular movement. This ensures that small oscillatory movements cannot be transmitted from the other (especially primary) flywheel to the one (especially secondary) flywheel of such torsional vibration damper. FIG. 4 illustrates a further modification of the torsional vibration damper of FIGS. 1 to 3; this modified damper also includes a primary flywheel or mass 1 and a secondary flywheel or mass 2. When the basic friction 4 is overcome, at least one of the flywheels 1, 2 can turn relative to the other of these flywheels. The first energy storing device 8 comprises at least one discrete energy storing element 9 and is installed between the flywheels 1 and 2 in stressed condition. The second energy storing device 12 comprises a snap spring or kickover spring 13 having a radially outer portion which is secured to the primary flywheel 1 by a connecting member 15 including an abutment 16 for an intermediate part 41.

The intermediate part 41 is provided with two spaced-apart movement restricting abutments 43, 44 which limit the extent of movability of such intermediate part relative to the stop 16 of the connecting member 15. The part 41 further carries a second pair or set of abutments 46, 47 for two spherical freewheels 50, 51. The freewheel 50 is biased by a coil spring 52 which reacts against a supporting arm 53, and the freewheel 51 is biased by a coil spring 54 reacting against a supporting arm 55. The supporting arms 54, 55 are borne by or form part of a coupling element 58 which is movable relative to the intermediate part 41 and engages the central (radially inner) portion of the snap spring 13. The spherical elements 50, 51 can be clamped between the coupling element 58 and a clamping element 59 which latter is secured to the secondary flywheel 2.

An advantage of the feature that the snap spring 13 is fixedly secured to the primary flywheel 1 of the damper of FIG. 4 and is connected with the flywheel 2 through the medium of at least one freewheel is that the two flywheels can turn relative to each other through large angles without risking that the second energy storing device 12 would develop its degressive effect.

The spherical freewheels 50, 51 act in opposite directions and are installed in such a way that they cannot clamp simultaneously in both directions. These spherical freewheels can be replaced with self-locking clutches or with toothed parts made of sheet metal or the like. Furthermore, the reinforcing action can be achieved by resorting to a cone or to several laminations.

Still further, it is possible to employ a torsional vibration damper wherein the freewheel arrangement comprises a double-acting freewheel which is constructed, assembled and installed in such a way that it cannot simultaneously clamp in both directions of rotation of the flywheels.

The arrow 60 of FIG. 5 indicates that the spherical freewheel 50 engages the abutment 46, and the arrow 61 indicates that the spherical freewheel 51 contacts the respective abutment 47. Such situation develops when the torque M denoted by the sinusoidal curve in the bottom part of FIG. 5 reaches or assumes the zero value (this curve then intersects the abscissa (W) of the coordinate system shown in FIG. 5).

FIG. 6 illustrates that condition or situation when the second abutment 44 of the intermediate part 41 of FIGS. 4 to 7 is contacted by the stop 16. The arrow 62 indicates that the spherical freewheel 50 is confined between the coupling element 58 and the clamping element 59. The torque of the snap ring 13 has a negative value (see the coordinate system at the bottom of FIG. 6). The arrow 63 indicates that the spherical freewheel 51 contacts the abutment 47.

Referring now to FIG. 7, the movement limiting elements 67, 68 on the coupling element 58 abut the connecting member 15 on the primary flywheel 1. The arrow 65 indicates that the spherical freewheel 51 abuts the coupling element 58 (as at 46) as well as the clamping element 59. A further arrow 64 indicates that the spherical freewheel 50 is not fixed because it does not contact the abutment 46. This denotes that the primary mass or flywheel 1 and the connecting member 15 thereon are not prevented from continuing their movement relative to the secondary mass or flywheel 2. The spherical freewheels 50 and 51 cannot be simultaneously confined between the coupling element 58 and the clamping element 59. Consequently, the positive and negative branches of the characteristic curve of the torque M can extend all the way to the respective abutments or stops.

However, if a stop is moved outwardly, the entire unit continues to turn practically or essentially without the exertion of any force but becomes active again on reaching of the next partial loop.

Figure 8:
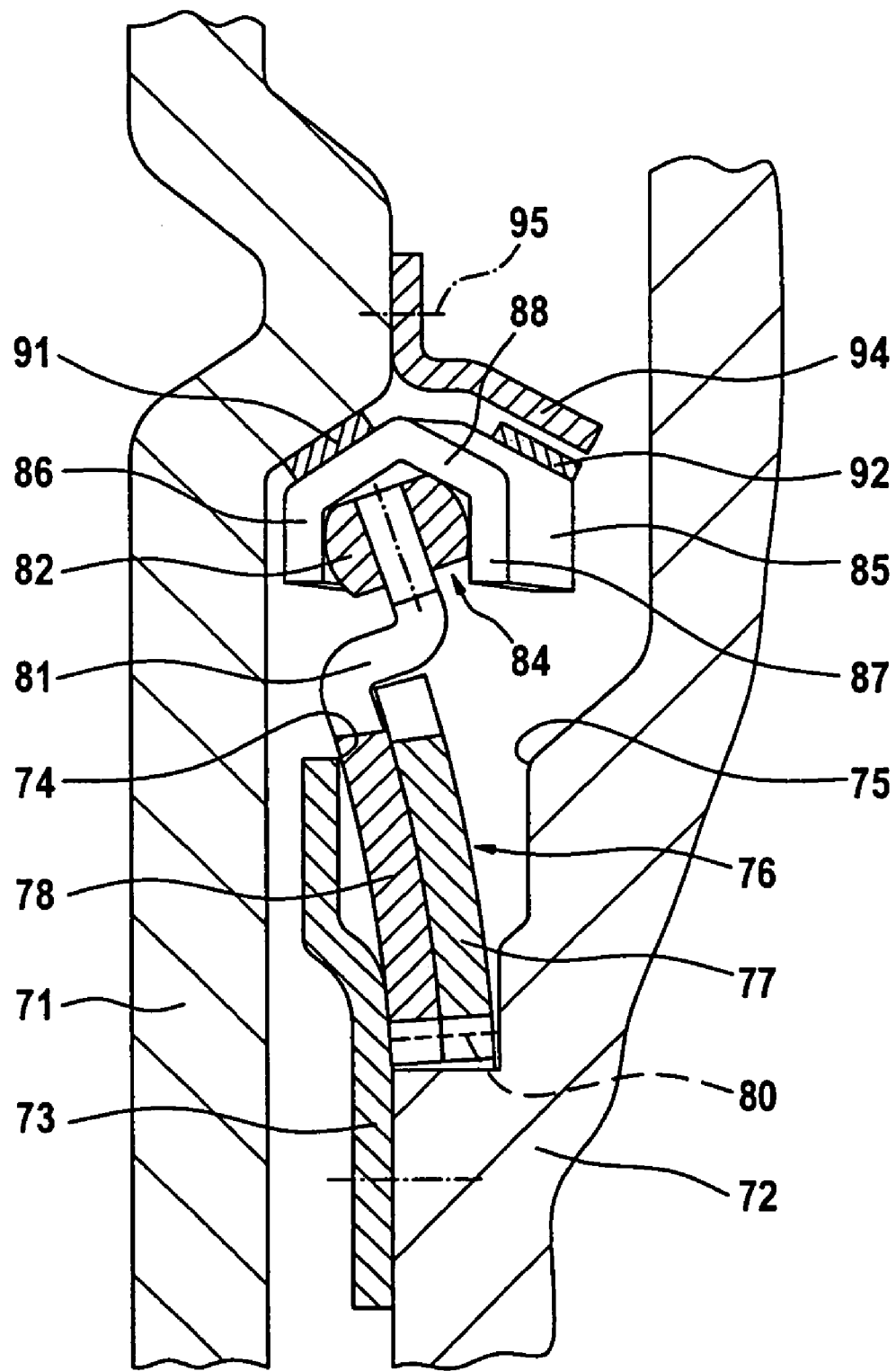
FIG. 8 is a sectional view of a part of a further torsional vibration damper.

FIG. 8 shows a primary flywheel or mass 71 which is coupled to a secondary flywheel or mass 72. The latter is connected with a sheet-metal abutment 73 which is provided with a stop 74. This stop is confronted by a second stop 75 which is secured to the secondary flywheel 72. A snap spring 76 between the stops 74, 75 includes two diaphragm springs 77, 78 which act against each other. The spring 76 can snap over between the illustrated position of contact of its diaphragm spring 78 with the stop 74 on the metallic abutment 73 and the position of contact of its diaphragm spring 77 with the stop 75.

The broken line 80 indicates in FIG. 8 a threaded connection (e.g., one of several screws) which serves to secure the radially inner portion of the snap spring 76 to the secondary flywheel 72. The radially outer portion of the diaphragm spring 78 comprises a finger or shaft 81 having a free end portion which carries a freewheel in the form of a roller 82. The latter is free to rotate relative to the shaft 81 and is confined in a guide channel 84 which is provided in a guide arrangement 85. This guide arrangement comprises two sidewalls 86 and 87 which flank the channel 84. A roof-shaped connector 88 secures the sidewalls 86, 87 to each other.

The radially outer portion of the guide arrangement 85 carries two friction linings 91, 92 which together form or define a self-clamping conical coupling arranged to operate between the parts 85 and 71. The friction lining 91 is shown in a position of engagement with the primary flywheel 71. A sheet-metal counterpart 94 is shown in a position in which it is spaced apart from the friction lining 92. The counterpart 94 is affixed to the primary flywheel 71 by threaded fastener means 95, e.g., by one or more screws.

When the spring 76 is caused to snap away from the position which is shown in FIG. 8, the friction lining 92 comes into engagement with the counter part 94. This ensures that the spring 76 can transmit torque between the primary and secondary flywheels 71, 72 before as well as subsequent to a change in the condition of such spring.

Figure 9:
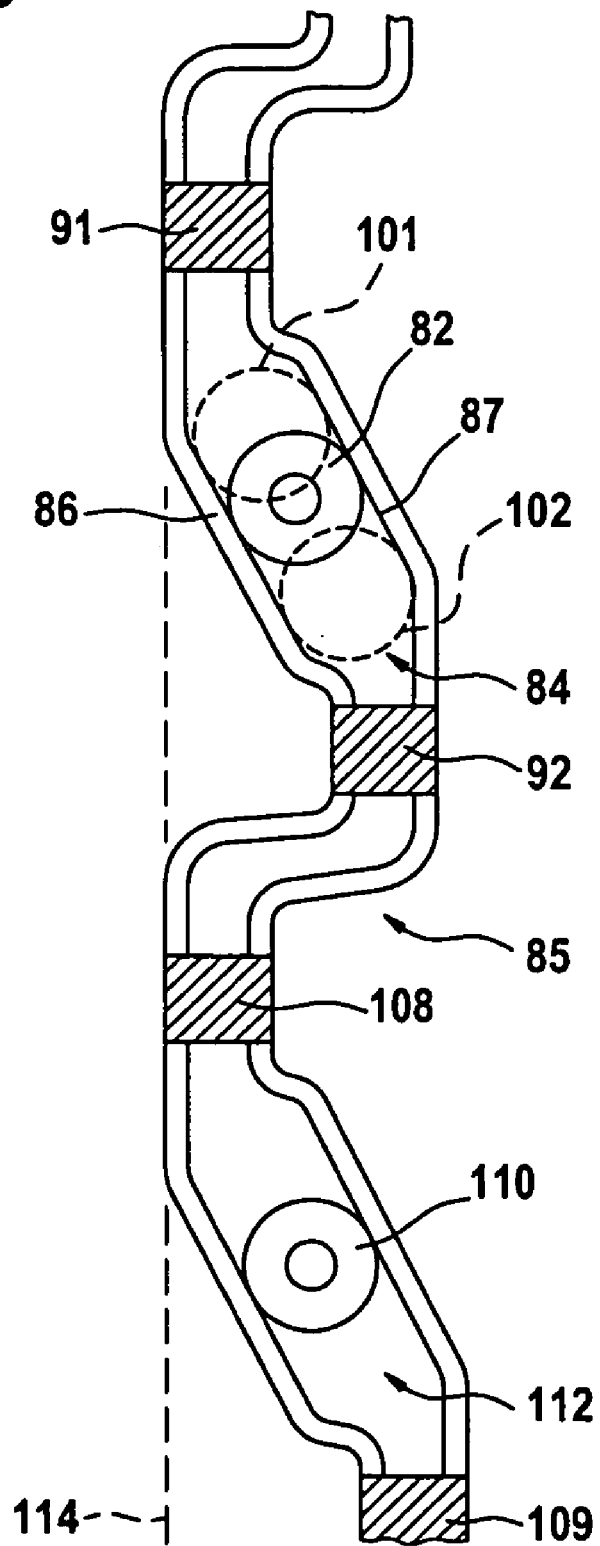
FIG. 9 is a bottom plan view of certain constituents of the damper which is shown in FIG. 8.

FIG. 9 shows that the roller 82 in the guide channel 84 is movable between two end positions which are denoted by the broken-line circles 101 and 102. The guide 85 carries additional friction linings 108, 109 and a further roller 110 is movable in a second channel 112 of the guide 85 between the spaced-apart friction linings 108, 109.

The angles between the circle part 114 and the guide channels 84, 112 equal or approximate 30°. The inclinations of the channels 84, 112 render it possible to convert the force of the snap-over spring 76 acting in the axial direction into a radial force. The center of the circle including the part 114 is located on the common axis of the flywheels 71 and 72.

The freewheeling roller (82) or rollers 82, 110 is or are mounted at the radially outer portion of the secondary flywheel 72. It is presently preferred to construct the torsional vibration damper of FIGS. 8 and 9 in such a way that it employs an annular array of equidistant roller-shaped flywheels which are installed at the radially outer portion of the composite snap spring 76. The number of such roller-shaped flywheels can greatly exceed two. Furthermore, the rollers 82, 110, etc. can be replaced with spherical flywheels (not specifically shown) or other rotary parts which are confined between the sidewalls 86, 87 at the radially outermost portion of the flywheel 72.

The inclination of the guide 84, 112 relative to the part 114 of the circle shown in FIG. 9 exhibits the advantage that it is possible to subject the roller 82, the rollers 82, 110, etc. (or suitable rotary equivalents thereof) to the action of a force which is applied in the axial direction while the flywheels 71, 72 are caused to turn relative to each other.

The sidewalls 86, 87 of the guide 85 can be made of a metallic sheet material, and this guide can be loosely mounted between the flywheels 71 and 72. The roller-shaped freewheels 82, 110, etc. can serve to maintain the guide 85 in a desired or optimum position. The sidewalls 86, 87 are preferably parallel to each other, at least in the regions adjacent the guide channel 84, so that they can properly guide the roller-shaped and/or otherwise configured freewheel(s) such as those shown at 82 and 110. The distance between the sidewalls 86, 87 decreases at the ends of the channel 84; this ensures that the convergent end portions of the sidewalls 86, 87 can serve as stops for the roller-shaped (or otherwise configurated) member 82 or members 82, 100 or members including those shown at 82, 100 plus additional rollers, spheres or the like.

An advantage of the roof-shaped connector 88, which comprises two mutually inclined sections secured to the radially outermost portions of the sidewalls 86, 87, is that it stabilizes the guide means including these sidewalls.

An advantage of the friction linings (such as 91, 92, and 108, 109) on the guide 85 is that, in dependency upon the condition of the second energy storing means 76, they can be clamped between the guide arrangement 85 and one (preferably 71) of the flywheels 71, 72. These friction linings facilitate the transmission of torque between the flywheels 71, 72 by way of the second energy storing means including the snap spring 76.

The various features of the torsional vibration damper embodying the present invention can be utilized jointly with each other as well as independently of one another.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torsional vibration dampers, particularly for use in the power trains of motor vehicles, and, therefore, such adaptations should and are intended to be comprehended within the meaning and range of equivalence of the appended claims.

What is claimed is:

1. A torsional vibration damper comprising:
a prime mover having a rotary output element;
a first mass non-rotatably connectable with the rotary output element, the first mass including a primary flywheel of a split flywheel;
a second mass rotatable relative to the first mass, the second mass including a secondary flywheel of the split flvwheel;
a first energy storing device operating between the first and second masses;
a second energy storing device operating between the first and second masses in parallel with the first energy storing device and with freedom of rotation relative to the first energy storing device; and
a connection disposed between the second energy storing device and the first and second masses and arranged to develop a degressive effect in response to only angular displacements of the first and second masses relative to each other of not more than 10°;
the connection including a first element configured to fixedly connect the second energy storing device to one of the first and second masses, a securing element configured to secure the second energy storing device to the other of the first and second masses, the securing element including a freewheel arrangement.

2. The damper as recited in claim 1, wherein the angular displacements are in the range of from 10° to 10°.

3. The damper as recited in claim 1, wherein the prime mover includes an internal combustion engine in a motor vehicle.

4. The damper as recited in claim 1, wherein the second energy storing device includes a resilient member having a degressive characteristic curve.

5. The damper as recited in claim 4, wherein the resilient member includes a snap spring.

6. The damper as recited in claim 1, wherein the freewheel arrangement includes two freewheels acting in opposite directions.

7. The damper as recited in claim 1, wherein the freewheel arrangement includes a double-acting freewheel.

8. The damper as recited in claim 1, wherein the second energy storing device includes a radially outer portion and the freewheel arrangement comprises at least one rolling element turnable relative to the radially outer portion of the second energy storing device.

9. The damper as recited in claim 8, further comprising a guide channel provided on the radially outer portion of the second energy storing device and receiving the at least one rolling element, the channel being inclined relative to a circle having a center on a common axis of the masses.

10. The damper as recited in claim 9, further comprising a guide arrangement having a pair of sidewalls flanking the channel.

11. The damper as recited in claim 10, wherein the sidewalls are at least substantially parallel to each other.

12. The damper as recited in claim 11, wherein the channel has a predetenriined width and the sidewalls have end portions spaced apart form each other less than the predetermined width.

13. The damper as recited in claim 10, further comprising an annular roof-shaped connector overlying a radially outermost portion of the channel between the sidewalls.

14. The damper as recited in claim 10, further comprising friction linings provided in the channel and arranged to be clamped between the guide arrangement and one of the first and second masses as a function of the condition of the second energy storing device.

15. The damper as recited in claim 14, wherein the one of the first and second masses is the first mass.

* * * * *

UNITED STATES PATENT AND TRADEMARK OFFICE
CERTIFICATE OF CORRECTION

PATENT NO. : 7,341,524 B2 Page 1 of 1
APPLICATION NO. : 11/058983
DATED : March 11, 2008
INVENTOR(S) : Oswald Friedmann It is certified that error appears in the above-identified patent and that said Letters Patent is hereby corrected as shown below:

Claim 2 in Column 10, line 15 should read -- from 1° to 10°. --

Claim 12 in Column 10, line 46 should read -- channel has a predetermined width --

Claim 12 in Column 10 line 47 should read -- spaced apart from each other --

Signed and Sealed this

Eighth Day of July, 2008

JON W. DUDAS
*Director of the United States Patent and Trademark Office*